(12) United States Patent
Borgos et al.

(10) Patent No.: US 7,248,539 B2
(45) Date of Patent: Jul. 24, 2007

(54) EXTREMA CLASSIFICATION

(75) Inventors: Hilde Grude Borgos, Hafrsfjord (NO); Paul Kvia, Hafrsfjord (NO); Thorleif Skov, Stavanger (NO); Lars Sonneland, Tananger (NO); Trygve Randen, Stavanger (NO)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/820,302

(22) Filed: Apr. 8, 2004

(65) Prior Publication Data

US 2004/0260476 A1 Dec. 23, 2004

Related U.S. Application Data

(60) Provisional application No. 60/461,782, filed on Apr. 10, 2003.

(51) Int. Cl.
*G01V 1/28* (2006.01)

(52) U.S. Cl. .............. 367/72; 367/38; 367/73; 702/16

(58) Field of Classification Search ............ 367/21–22, 367/38, 72–73; 702/14, 16, 17
See application file for complete search history.

(56) References Cited

U.S. PATENT DOCUMENTS 4,672,546 A * 6/1987 Flinchbaugh ................. 367/72
4,727,488 A * 2/1988 Flinchbaugh ................. 702/16

(Continued)

FOREIGN PATENT DOCUMENTS

EP 0 181 216 A3 7/1985

(Continued)

OTHER PUBLICATIONS

Donias, et al. "Curvature of Oriented Patterns: 2-D and 3-D Estimation from Differntial Geometry." IEEE 1998.*

(Continued)

*Primary Examiner*—Jack Keith
*Assistant Examiner*—Scott A. Hughes
(74) *Attorney, Agent, or Firm*—Vincent P. Loccisano; William B. Batzer; Jody Lynn DeStefanis (57) ABSTRACT

A method for automated extraction of surface primitives from seismic data is presented. A preferred embodiment of the method includes defining, typically with sub-sample precision, positions of seismic horizons through an extrema representation of a 3D seismic input volume; deriving coefficients that represent the shape of the seismic waveform in the vicinity of the extrema positions; sorting the extrema positions into groups that have similar waveform shapes by applying classification techniques with the coefficients as input attributes using unsupervised or supervised classification based on an underlying statistical class model; and extracting surface primitives as surface segments that are both spatially continuous along the extrema of the seismic volume and continuous in class index in the classification volume. Three primary applications of the surface primitives are described: combining surface primitives into complete horizon interpretations; defining closed volumes within the seismic volume as the closure of vertically arranged surface primitives; or estimating fault displacement based on the surface primitives. A related computer system and computer program product for implementing the method are also described.

20 Claims, 7 Drawing Sheets

U.S. PATENT DOCUMENTS

| | | | |
|---|---|---|---|
| 5,570,106 A * | 10/1996 | Viswanathan | 715/856 |
| 5,615,171 A * | 3/1997 | Hildebrand | 367/72 |
| 5,966,672 A * | 10/1999 | Knupp | 702/16 |
| 6,014,344 A * | 1/2000 | Baker, III | 367/48 |
| 6,016,287 A * | 1/2000 | Klebba et al. | 367/72 |
| 6,240,370 B1 | 5/2001 | Sonneland et al. | 702/17 |
| 6,278,949 B1 * | 8/2001 | Alam | 702/16 |
| 6,388,947 B1 * | 5/2002 | Washbourne et al. | 367/73 |
| 6,463,387 B1 | 10/2002 | Runnestrand et al. | 702/16 |
| 2002/0126896 A1 * | 9/2002 | Pedersen | 382/190 |
| 2003/0023383 A1 * | 1/2003 | Stark | 702/14 |

FOREIGN PATENT DOCUMENTS

| | | |
|---|---|---|
| GB | 407989 | 8/1932 |
| GB | 2 375 448 B | 10/2003 |
| WO | WO 98/37437 | 8/1998 |
| WO | WO 01/33255 | 10/2000 |

OTHER PUBLICATIONS

Borgos, H. G. et al. "Classification of Production Effects from 4D Seismic Surveys," *EAGE*, pp. 1-4 (May 2002).

Celeux, G. et al. "Gaussian Parsimonious Clustering Models". *Pattern Recognition*, vol. 28, No. 5, pp. 781-793 (1995).

Randen, T. et al. "Automatic Extraction of Fault Surfaces from Three-Dimensional Seismic Data". *Expanded Abstr. , Int. Mtg. Soc. Exploration Geophys.*, pp. 551-554, Fig. 8a (Sep. 2001).

* cited by examiner

Observed trace   Reconstructed trace   Error

EXTREMA CLASSIFICATION

RELATED APPLICATION

This application claims the benefit of U.S. Provisional Application No. 60/461,782, filed Apr. 10, 2003, incorporated herein by reference.

FIELD OF THE INVENTION

This invention relates to the field of seismic reservoir characterisation, and in particular to the automated mapping of structural geometries, like seismic interfaces and fault displacements.

BACKGROUND OF THE INVENTION

Formation layers, lithological boundaries, sedimentary bedding, etc. in the underground can be defined through the interfaces between different lithologies, which produce seismic reflections due to impedance contrasts. These seismic reflections are referred to as seismic horizons, and interpretation of seismic horizons plays an important role in the structural characterization of 3D seismic data. Seismic horizons are commonly interpreted as being located along minimum, maximum, or zero crossing values in a seismic volume, and interpretations can be obtained by manual or automatic extraction of such surfaces. Structurally complex regions are a challenge to existing interpretation procedures, both automated and manual. For the manual interpreter, structural complexity produces ambiguities, and the interpretation process can become very time consuming. The continuity constraint incorporated by most automated algorithms may fail to hold. In particular, automatic continuation of an interpretation across faults is a challenge.

The present invention addresses this problem by laterally detecting and combining horizon segments having similar seismic waveforms. The mapping is not restricted to spatial continuity in the position of the seismic horizon, but instead determines possible lateral continuations based on similarity of signal shape. The inventive method represents waveforms as coefficients, typically seismic derivatives, that can be used to reconstruct the seismic trace in the vicinity of the extrema positions, such as by utilizing Taylor series expansions. The term "extrema" as used throughout this patent application includes any characteristics of seismic traces that can be used to track the positions of seismic horizons, such as minimum values, maximum values, zero-crossing values, midpoints between zero-crossing values and maximum or minimum values, etc. Derivatives that can be used in the Taylor series reconstruction and sub-sample accuracy extrema positions can be calculated based on orthogonal polynomial spectral decompositions of the seismic traces, such as described in U.S. Pat. No. 6,240,370, issued May 29, 2001 to Lars Sønneland et al.

The lateral continuations of horizons can be exploited to automatically estimate fault displacement, with a spatially varying displacement offset along the fault plane. Fault displacement influences the connectivity of hydrocarbon bearing lithologies, and assessment of the displacement provides an improved description of a reservoir. The present invention can calculate the displacement along pre-interpreted fault planes, for example fault planes that have been extracted from the seismic data using the methodology described in U.K. patent GB 2,375,448 B issued Oct. 15, 2003 to Schlumberger Holdings Limited.

Accordingly, it is an object of the present invention to provide an improved method of processing and interpreting seismic data. In one embodiment, this involves extracting surface primitives, and grouping extrema positions where these surface primitives are both spatially continuous along the extrema of the seismic volume and are continuous in class index in the classification volume.

SUMMARY OF THE INVENTION

Classification tools are widely used in both 3D and 4D reservoir characterization, for example in the mapping of 3D structures, lithological properties and production effects. In this invention, we extend the application area of the classification methodology into automated interpretation of seismic reflectors and fault displacement calculations. By classifying the seismic waveform along reflectors, we gain an improved automated interpretation that also performs well in structurally complex regions. The seismic waveform around the extrema positions can be represented by a set of coefficients that can be input into the classification process. These coefficients can also be used to reconstruct the seismic data waveform shape in the vicinity of the extrema positions, such as by using Taylor series reconstruction. One-point support for the reconstruction is an important element in the classification of seismic reflectors, as it allows the classification to be performed only along extrema positions while utilizing information regarding the waveforms in intervals around the extrema positions. This substantially reduces the number of data points to be classified, allowing the 3D classification to be run on a sparse 3D volume. The workflow of this preferred embodiment of the method, referred to as extrema classification, is outlined in FIG. 1. A related computer system and computer program product for implementing the inventive method are also described.

For existing fault surfaces, the present invention can automatically extract and match pairs of horizons on opposite sides of each fault. The displacement can then be calculated as the offset of these horizons in their intersections with the fault plane. This constitutes a fully automatic procedure for fault displacement assessment, providing displacement estimates that vary spatially along the fault plane.

DETAILED DESCRIPTION

Figure 1:
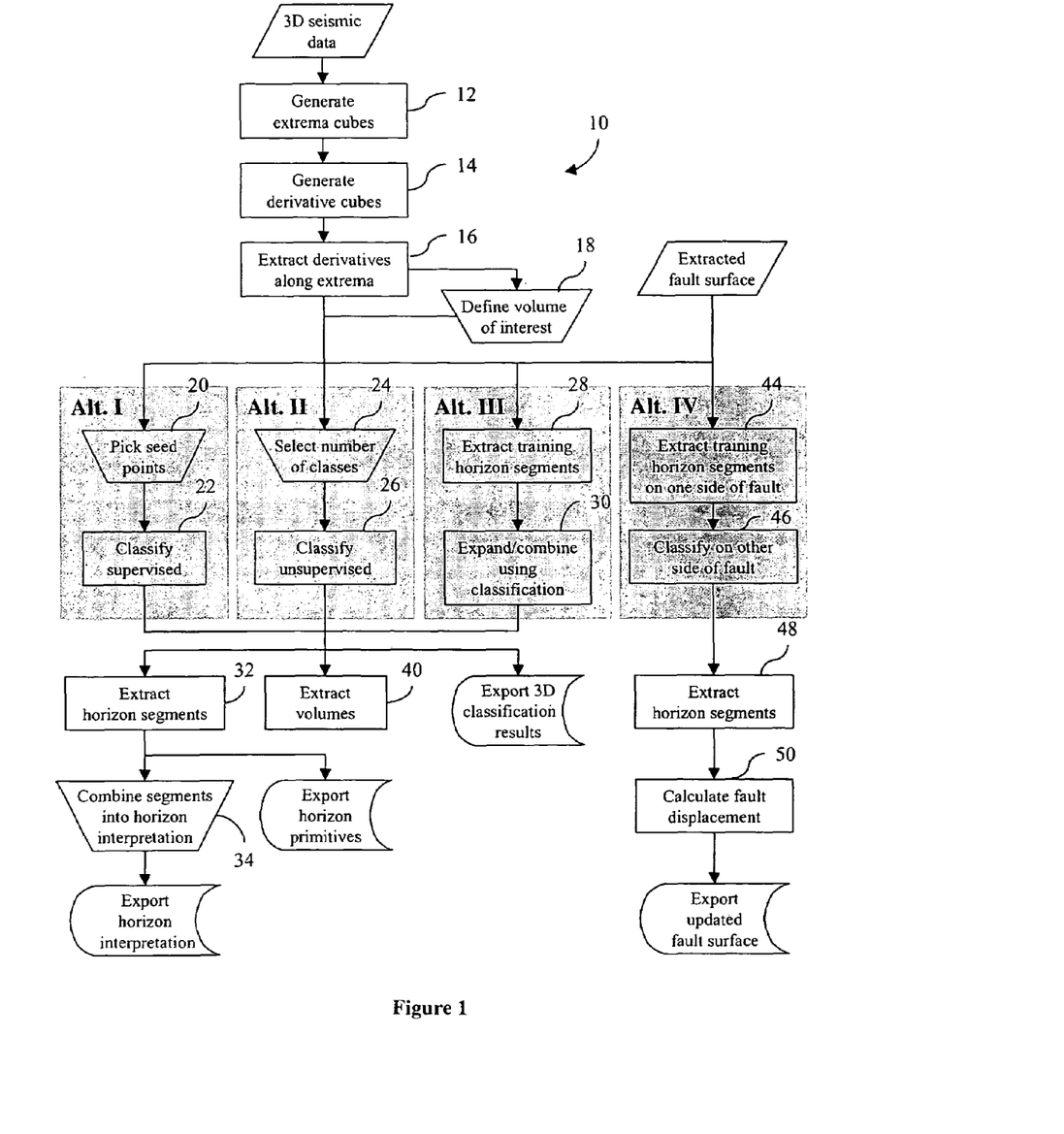
FIG. 1 is flow diagram outlining the extrema classification methodology.

A flow diagram outlining the extrema classification methodology is shown in FIG. 1 as Extrema Classification Methodology 10. In this method, structural interpretations are placed on seismic extrema, and the first step in the workflow of the current invention is to obtain a representation of extrema within the seismic volume, preferably with sub-sample precision. This is shown in FIG. 1 as Generate Extrema Cubes 12 and involves identifying a plurality of extrema points associated with said seismic data, as discussed in more detail below.

Orthogonal polynomials may be used to reconstruct the seismic trace S(z) locally, such as by using the Volume Reflection Spectral decomposition technique (VRS) where orthogonal Chebyshev polynomials $g_i$ are used as the basis functions:

$$S(z)=b_0 g_0(z)+b_1 g_1(z)+\ldots+b_n g_n(z) \quad (1)$$

This method is described in significantly more detail in U.S. Pat. No. 6,240,370, issued May 29, 2001 to Lars Sønneland et al.

Figure 2:
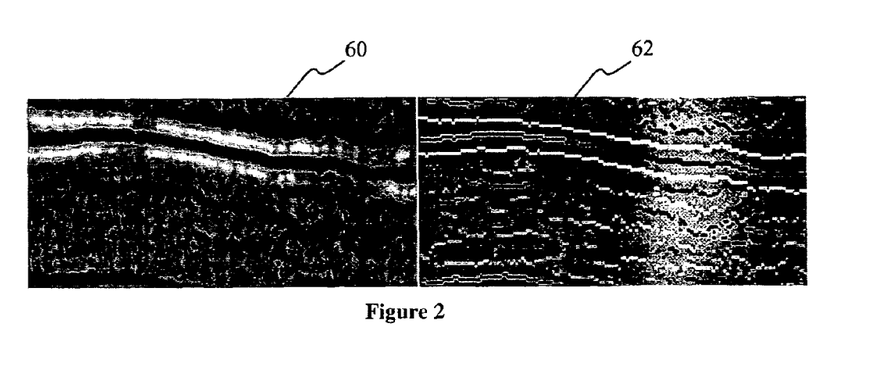
FIG. 2 displays a vertical seismic section and the corresponding sparse extrema representation.

Orthogonal polynomial reconstruction provides an analytic representation of the seismic signal from which high-accuracy positions of extrema can be calculated. The resulting extrema points may be represented through two sparse 3D volumes. A first cube can contain the amplitudes at the extrema, positioned at the voxels vertically closest to the extrema points. If the types of extrema being identified are zero-crossings, then a non-zero placeholder value (such as 1.0) could be used to mark the identified voxels. Voxels between extrema points are generally assigned zero value. A second cube contains values describing the vertical distances between the voxel positions where the amplitudes are stored, and the exact positions of the extrema, i.e., the sub-sample precision. The set of voxels containing extrema data is the same for the two cubes, but they contain amplitude and sub-sample position values respectively. FIG. 2 shows a vertical seismic section 60 and a sparse extrema representation 62 of this seismic section, a cross section of the cube containing these amplitude values. While the figures shown throughout this patent application are depicted in grey-scale, it will be understood that color displays of this information are customary and are preferable for many types of applications.

The second step in the workflow of the current invention is to generate a set of coefficients that characterize the seismic data in the vicinity of the extrema positions, which we refer to as "waveform attributes". The coefficients can be derivatives of the seismic signal at the single extrema data point and the seismic trace in the vicinity of the extrema point can be reconstructed using these coefficients in a Taylor series expansion:

$$S(z+h) \approx S(z)+hS'(z)+h^2 S^2(z)/2!+\ldots+h^n S^n(z)/n! \quad (2)$$

This reconstruction gives a good fit to the seismic signal in a region around the point z, where the quality of the reconstruction depends on the number of coefficients/derivatives included in the Taylor series. Each trace in the 3D seismic volume is typically reconstructed using VRS decomposition, where the polynomial reconstruction (1) enables analytical calculations of the derivatives $S^k(z)$ at each sample point along the trace. Although multiple data points are involved in calculating the derivative values, the seismic signal in a region can afterwards be reproduced based on a set of derivatives obtained for one single data point. In particular, if derivatives are obtained only at extrema points along the seismic trace, this is sufficient to reconstruct the full seismic trace. This process is shown in FIG. 1 as Generate Derivative Cubes 14. The derivatives are then extracted along the extrema positions and this is shown in FIG. 1 as Extract Derivatives Along Extrema 16. Typically, a particular portion of the subsurface area covered by the seismic data is selected by the user for more detailed analysis and this is shown in FIG. 1 as Define Volume of Interest 18.

Figure 3:
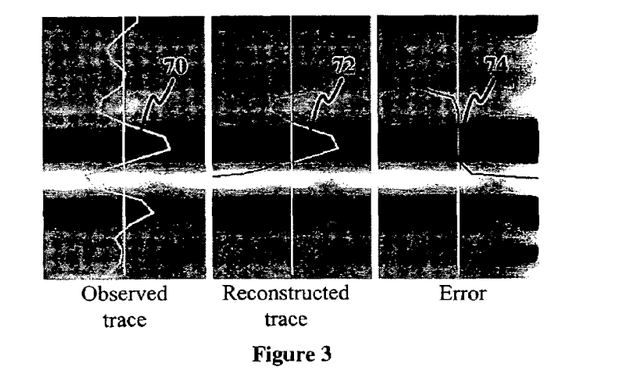
FIG. 3 illustrates the Taylor series reconstruction of a single seismic trace, displaying the observed trace, the reconstructed trace and the error.
Figure 4:
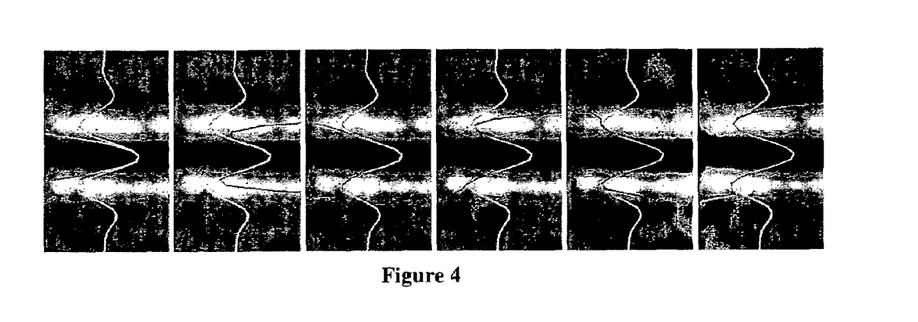
FIG. 4 shows the effect of increasing the number of terms in the Taylor series reconstruction of a seismic trace.

FIG. 3 shows an example of an observed seismic trace 70, a Taylor series reconstruction 72 of this seismic trace, and an error term 74 showing the difference between the observed seismic trace and the Taylor series reconstruction of the seismic trace. The error term is observed to be insignificant around the one-point support for the reconstruction. FIG. 4 illustrates how the vertical region of insignificant error increases from left to right, as the number of derivatives included in the reconstruction (2) is increased.

Other types of reconstruction methods with one-point support can also be used in the inventive method. The one-point support of the reconstruction is an important feature, since this enables the classification to be limited to extrema points only, but still be related to the overall shape of the seismic signal in the vicinity of the extrema points.

The next step involves forming groups of extrema points that have similar coefficients. Four alternative approaches to classification of seismic extrema may be utilized: three aiming at producing surface primitives for horizon interpretation or volume building; and one for fault displacement estimation. Common to all approaches is an underlying statistical model, assuming the derivative attribute vectors $a_k$ of length p, where k is the voxel index, are Gaussian distributed within each class. The number of derivative attributes to include in the classification is typically selected by the user. Furthermore, the first derivative may be excluded from the classification, since they are zero, by definition, at maximum or minimum extrema points.

The mean vectors $\mu=(\mu_1, \ldots, \mu_n)$ and covariance matrices $\Sigma=(\Sigma_1, \ldots, \Sigma_n)$ of the Gaussian distributions describe respectively the position and shape in attribute space of classes $1, \ldots, n$. The probability density function (pdf) of the complete set of K attributes vectors $a=(a_1, \ldots, a_K)$ given Gaussian parameters and class indexes $c=(c_1, \ldots, c_K)$ of all voxels, is given as:

$$f(a|c, \mu, \Sigma) = \prod_{k=1}^{K} f(a_k | c_k, \mu_{c_k}, \Sigma_{c_k}), \quad (3)$$

where the pdf of voxel k is given as:

$$f(a_k \mid c_k, \mu_{c_k}, \Sigma_{c_k}) = \frac{1}{(2\pi)^{p/2} \mid \Sigma_{c_k} \mid^{1/2}} \exp\{-(a_k - \mu_{c_k})' \Sigma_{c_k}^{-1} (a_k - \mu_{c_k})/2\}. \qquad (4)$$

Figure 5:
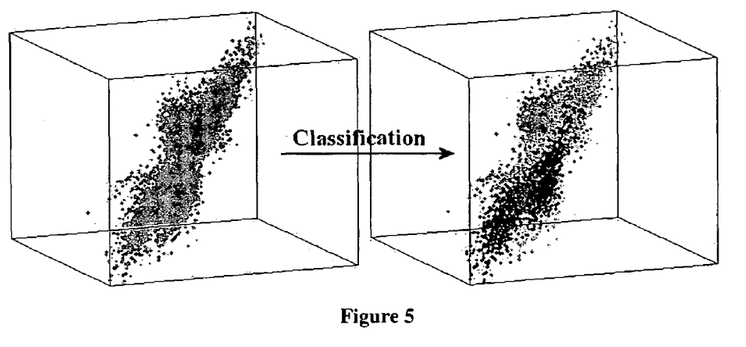
FIG. 5 illustrates how attribute vectors plotted in attribute space may be subdivided into different classes.

The unknowns are the class indexes $c_k$ and the Gaussian parameters $\mu$ and $\Sigma$, which can be estimated using either supervised or unsupervised classification. The aim of the classification process is to subdivide the attribute vectors into n classes, providing a separation of the attribute space as illustrated for three attributes in FIG. 5. Each shade in the right plot in the figure represents one class. The choice of an underlying Gaussian model can alternatively be generalized to other statistical models and the classification algorithm can be replaced by alternative classification approaches, such as neural networks.

The volume of interest for performing the extrema classification can be chosen, for instance, as a vertical window with constant thickness or as the volume confined between two pre-interpreted seismic horizons. This enables, for example, the extrema classification to be run only within a reservoir formation.

In the first approach, supervised classification with picked seed points, the user picks seed points along reflectors of interest, each reflector representing a separate class. This is shown in FIG. 1 as Pick Seed Points 20. Small, spatially continuous segments of the horizons are automatically extracted from the extrema cube, starting in the picked seed points, and the derivatives obtained along these extrema segments are applied as training data. The Gaussian attributes of each class are estimated from the training data, as the sample mean and sample covariance:

$$\hat{\mu}_c = \frac{1}{m_c} \sum_{k \in T_c} a_k, \hat{\Sigma}_c = \frac{1}{m_c} \sum_{k \in T_c} (a_k - \hat{\mu}_c)^2, \qquad (5)$$

where $T_c$ is the set of training data for class c and $m_c$ is the number of training data in $T_c$. Two additional background classes are included: positive extrema not being training data; and negative extrema not being training data. Each extrema not being a training point is then assigned the class index maximizing the pdf (4) in that voxel. This process is shown in FIG. 1 as Classify Supervised 22.

In the second approach, unsupervised classification with a specified number of classes, the number of classes is provided as a user input (shown in FIG. 1 as Select Number of Classes 24), and the attribute vectors are automatically divided into the specified number of classes, by estimating optimal class indexes and Gaussian parameters (shown in FIG. 1 as Classify Unsupervised 26). The estimates are typically obtained by maximizing the likelihood function derived from the pdf (3). The maximum likelihood equations constitute a non-linear system of equations, and cannot be solved analytically. Instead, an iterative scheme is applied to find the optimal parameter estimates. For an example of this type of interative scheme, see Celeux, G. and Govaert, G. (1995), Gaussian parsimonious clustering models, *Pattern Recognition*, 28(5), 781-793.

In the third approach, unsupervised classification with an unspecified number of classes, the algorithm starts with selecting at random a seed point among all extrema, and extracts from the extrema cube a small, spatially continuous horizon segment locally around the seed point. This process is shown in FIG. 1 as Extract Training Horizon Segments 28. The extracted data constitutes a new class. The Gaussian parameters (5) are first estimated based on derivative attributes from this surface segment and for a background class of extrema not contained in the training segment. Next, the remaining extrema points are classified into either the class of the training segment or the background class, whichever maximizes the pdf (4). The initial horizon segment is then expanded along continuous voxels in the extrema cube, by including only those extrema points assigned to the same class. The procedure is repeated starting in new randomly selected extrema points not belonging to existing horizon segments, until all extrema points are contained in horizon segments with assigned classes. This produces a set of horizon segments, all with different class indexes. The number of classes is then reduced hierarchically, using classification to group horizon segments having similar seismic waveform shapes, i.e., similar average derivative attribute values along the surface segment. This process is shown in FIG. 1 as Expand/Combine Using Classification 30.

In a fourth approach, unsupervised classification for fault displacement estimation, fault surfaces are provided as input to the extrema classification algorithm. First, spatially continuous horizon segments are automatically extracted from one side of the fault, each assigned to a separate class index. This is shown in FIG. 1 as Extract Training Horizon Segments on One Side of Fault 44. Attribute values along these surface segments are then used as training data (5), and extrema points on the opposite side of the fault surface are assigned the class maximizing the pdf (4). Next, spatially continuous and class consistent horizon segments are automatically extracted from the classified extrema on the second side of the fault. The vertical sequence of the different classes on either side of the fault is compared, and classes being non-consistent within the vertical sequence across the fault are excluded from further calculations. This process is shown in FIG. 1 as Classify on Other Side of Fault 46.

Figure 6:
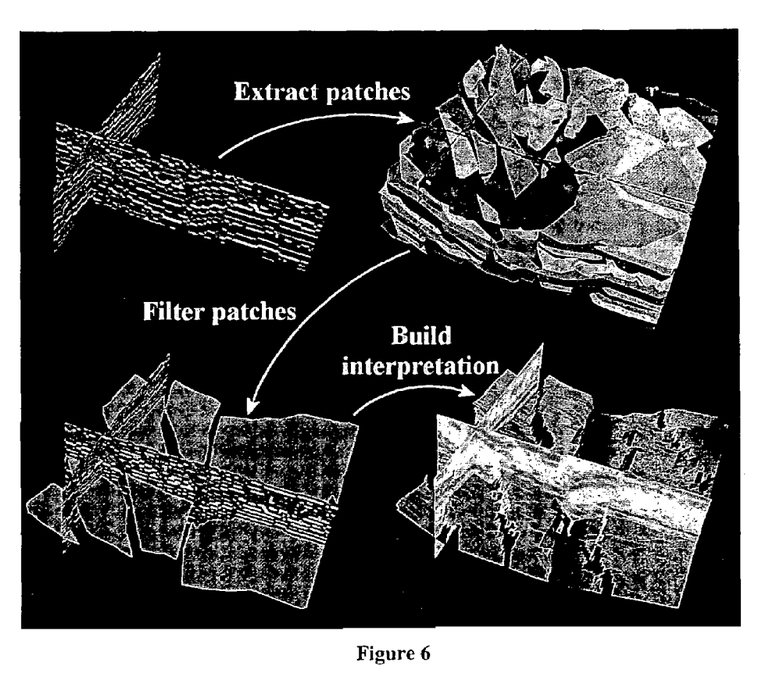
FIG. 6 shows how horizon patches may be extracted from an extrema classification cube, and how a horizon interpretation can be built.

As shown in FIG. 1, the inventive method may be used to interpret seismic horizons. The initial output from the extrema classification is a sparse 3D volume, with class indexes assigned to extrema points from the original input seismic volume. Thus, all classified data points are positioned on a reflector. Structural interpretations, e.g. horizon interpretations or volume interpretations, can be obtained by extracting and combining extrema points belonging to one, or a few, classes only. In order to obtain class consistent interpretations, small spatially continuous surface segments (patches) belonging to one class only can be extracted automatically from the extrema classification cube. This is shown in FIG. 1 as Extract Horizon Segments 32. By filtering on properties like class index, position, attribute values, etc. attached to each patch, a set of patches can be combined into a final horizon interpretation. This process is shown in FIG. 1 as Combine Segments Into Horizon Interpretation 34. In FIG. 6, a sparse extrema classification cube is shaded by class index (upper left). Class consistent patches are extracted (upper right), and the number of patches of interest reduced by filtering (lower left). The patches are combined into a horizon interpretation (lower right), shaded by its depth.

A class consistent horizon interpretation, resulting from one class only, consists of extrema points with a similar shape of the seismic waveform in a neighborhood around the extrema, which are likely to belong to the same reflector.

The building of the final horizon interpretations typically requires some manual effort. The extrema classification provides a set of patches, or geometry primitives, forming the basis for the interpretation. The classification index guides the interpreter in structurally complex regions, reducing the risk of interpreting along the wrong events. Overall, the extrema classification method can substantially improve the manual horizon interpretation process, easing the job and reducing the time spent by the interpreter.

Figure 7:
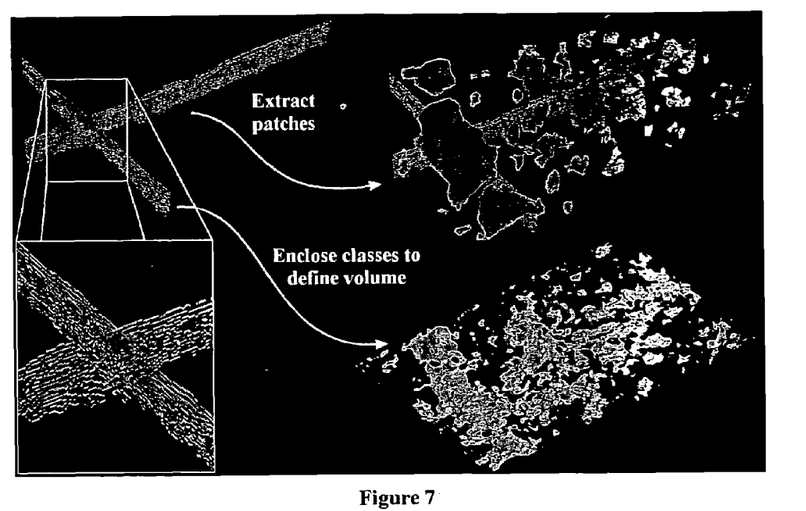
FIG. 7 shows how a extrema classification cube can be used to define seismic volumes.

The inventive method may also be used to extract seismic volumes. When one or a few classes appear repeatedly vertically within a region, as illustrated in FIG. 7, the seismic feature represented by these classes is better described as a volume than as a surface. A volume representation is obtained by defining the volumetric closure around the class or classes defining the seismic body, and should be interpreted as a seismic volume containing multiple reflectors of similar seismic response. This process is shown in FIG. 1 as Extract Volumes 40.

Figure 8:
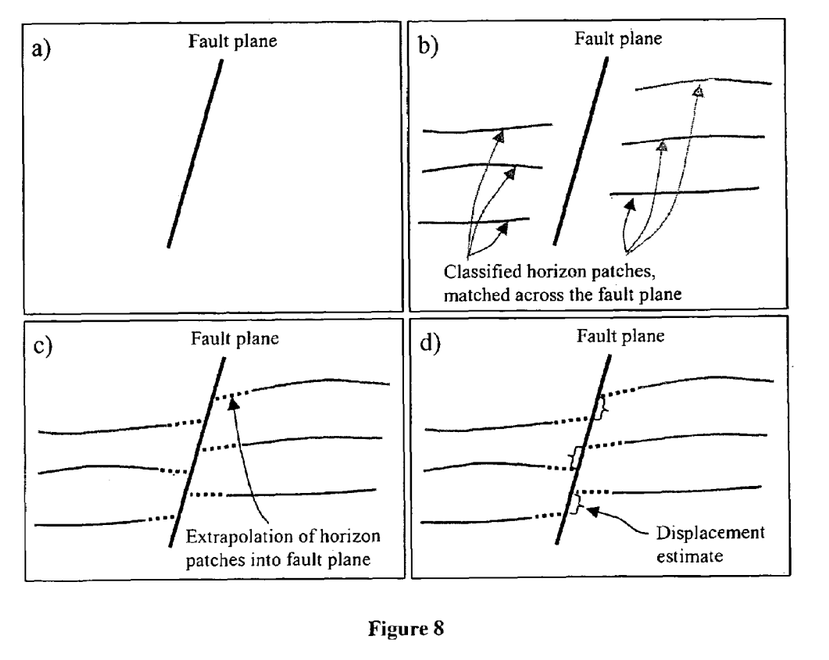
FIG. 8 illustrates how the extrema classification technique can be used in the calculation of fault displacement estimates.

The inventive method may also be used in the estimation of fault displacements. Fault displacement is defined as the distance a horizon has been offset along the fault surface, due to faulting. Starting with an existing fault surface [see, for instance, Randen, T., Pedersen, S. I., and Sønneland, L. (2001), Automatic extraction of fault surfaces from three-dimensional seismic data, In *Expanded Abstr., Int. Mtg., Soc. Exploration Geophys.,* 551-554] (FIG. 8a), the extrema classification provides a set of horizon segments located on either side of a fault surface. This is shown in FIG. 1 as Extract Horizon Segments 48. Pairs of horizons belonging to the same class are identified on opposite sides of the fault, and the vertical sequence of classes is the same on either side of the fault (FIG. 8b). A region around the fault surface, e.g., a fault zone, is excluded from the volume of interest, since the seismic signal may be corrupted by the fault in the close vicinity of the fault surface. Intersection lines between the horizons and the fault surface are obtained by extrapolating the horizon segments in their respective dip directions into the fault surface, represented by a plane placed optimally through the potentially non-planer surface (FIG. 8c).

Fault displacement calculations can be performed between the two intersection lines corresponding to a pair of horizons. The calculations are performed in the dip-slip direction, assuming no lateral movement along the fault surface. Displacements are calculated between pairs of intersection points, one from each of the two horizon segments, in a vertical plane placed perpendicular to the horizontal direction of the fault plane (FIG. 8d). Each pair of horizon segments provides a displacement estimate varying laterally along a curve in the fault plane, and the full set of horizon segments provides a vertically varying set of estimates along such curves. A full coverage displacement estimate is obtained by interpolating between the local estimates along the curves. This procedure is shown in FIG. 1 as Calculate Fault Displacement 50.

Figure 9:
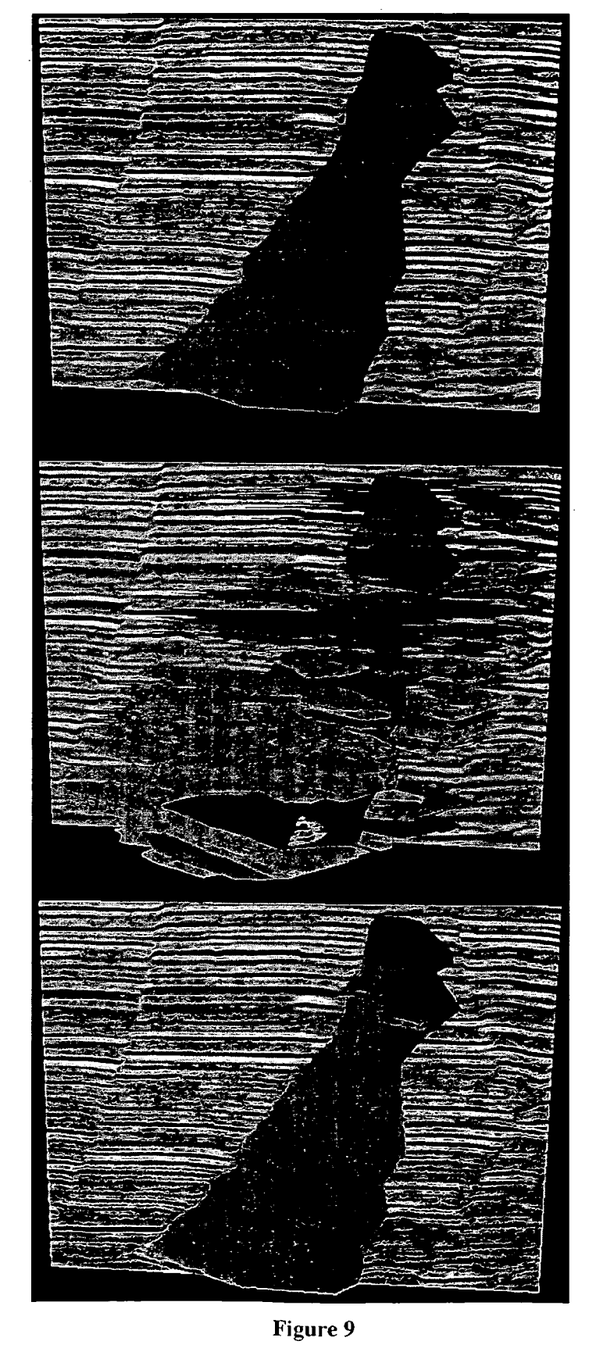
FIG. 9 exemplifies fault throw calculations along an extracted fault plane, using the extrema classification technique: fault surface, extracted horizon patches, and fault surface shaded by throw value.

The sample units of a seismic volume typically differs vertically and laterally, e.g., milliseconds in the vertical direction and meters in the horizontal direction. To avoid confusion between different measurement units, the displacement may be decomposed into the vertical throw component and the horizontal heave component. FIG. 9 illustrates a fault plane provided as input to the extrema classification procedure (top), the set of classified horizon segment pairs assigned different shades for each pair (middle), and the spatially varying throw estimate obtained from the horizon segments (bottom).

Figure 10:
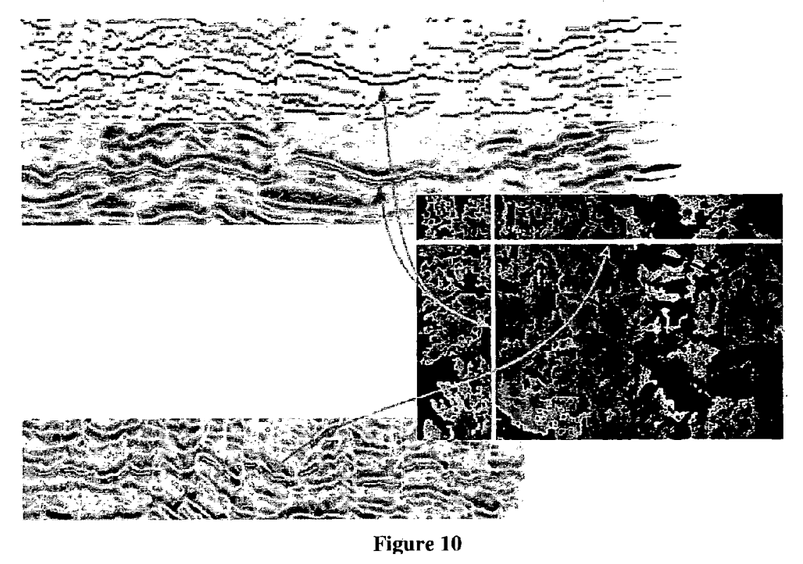
FIG. 10 gives an example of a horizon interpretation obtained in a faulted region.

The primary advantage of the present invention over existing methodologies for automated seismic interpretation lies in its ability to track reflectors laterally in structurally complex regions, for example across faults. FIG. 10 shows an example where the unsupervised extrema classification method has been applied to automatically extract a horizon that is cut by numerous faults. The reflector interpretation is shown both in map view and plotted on an inline and crossline section. The mapped reflector has a polygonal fault structure, and is interpreted automatically across a number of faults. Void regions in the interior of the fault blocks correspond to minor classification errors, and can easily be interpolated to produce a full coverage interpretation.

Figure 11:
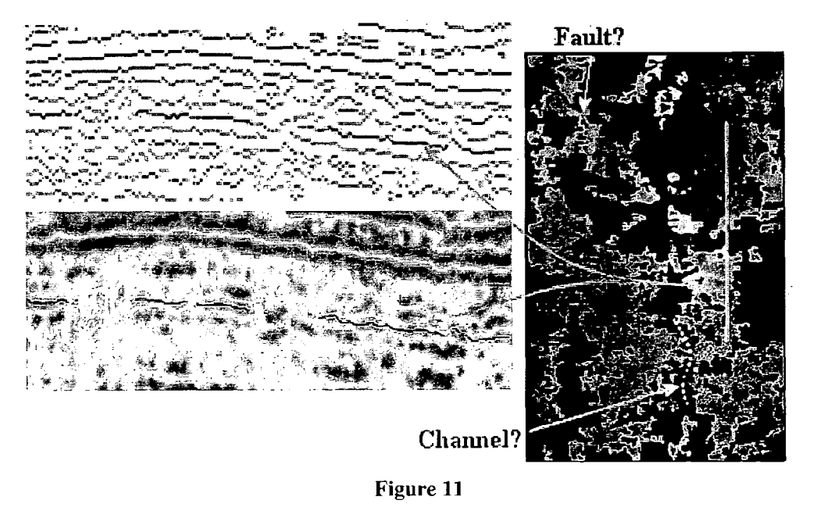
FIG. 11 illustrates how extrema classification has been applied to extract a horizon in a region with weak seismic signal.

FIG. 11 shows an example where the major challenge in horizon interpretation is the weak seismic signal. The reflector of interest is located in a relatively homogeneous sand formation, containing numerous thin, horizontal shale layers not thick enough to produce strong acoustic impedance contrasts. Extrema classification is applied to ease the horizon interpretation. The resulting interpretation has a good lateral coverage in most regions, but also shows some void regions. According to the extrema classification results, the void regions correspond to regions where the seismic response is lacking, or differs substantially from the rest of the reflector. This is valuable information, which can be related to structures like faults, channels, etc.

Figure 12:
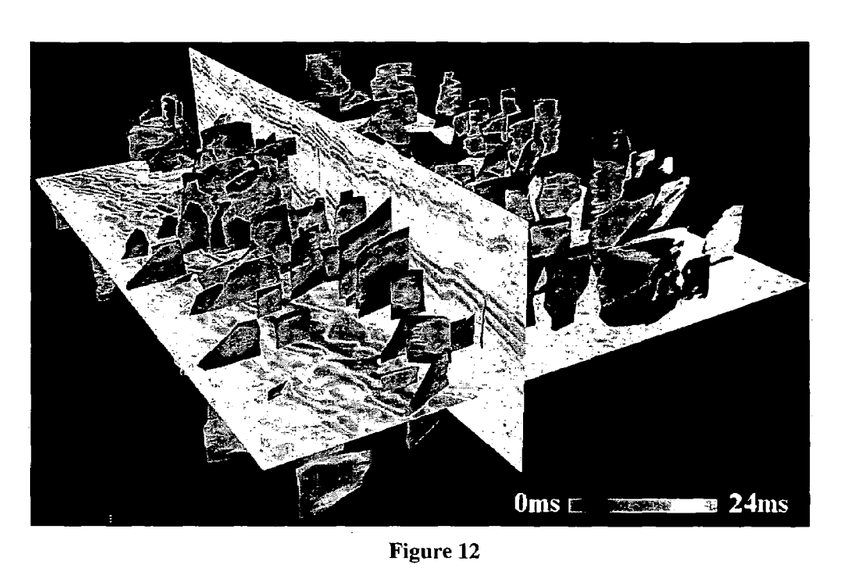
FIG. 12 shows a fault population in which extrema classification has been used to estimate fault displacements.

In FIG. 12, the extrema classification technique has been applied to estimate fault displacements for a set of pre-interpreted faults. FIG. 12 shows the throw component of the spatially varying displacement estimates. For many of the faults, the throw is observed to be at a maximum at the center of the fault, decreasing towards the boundary, which is a typical geological feature of faults.

Figure 13:
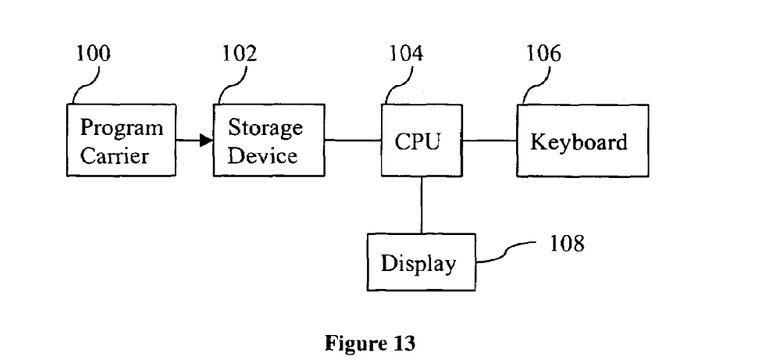
FIG. 13 shows a schematic representation of a computer system and computer program product associated with the implementation of the inventive method.

The inventive method will typically be implemented on a computer system of the type shown in schematic format in FIG. 13. The processes of the inventive method are translated into computer readable program code means and are recorded on a computer usable medium, such as Program Carrier 100, to produce a computer program product for processing and interpreting seismic data. This computer usable medium may consist of magnetic or optical recording media, such as floppy disks, hard drives, flash memory, CD-ROMs, or magnetic tapes. The contents of the computer program product are typically loaded onto a Storage Device 102 attached to a CPU 104 that executes the computer program recorded on the computer usable medium. The computer program may be loaded onto the Storage Device 102 either by placing the Program Carrier 100 into a reading device connected to the CPU 104 or by downloading the computer program using a network, such as a local area network or the Internet. When equipped with an operator input device (such as a Keyboard 106) and an output device (such as Display 108), the computer system shown in FIG. 13 is capable of processing and interpreting seismic data in accordance with the inventive method described above.

While the invention has been described herein with reference to certain examples and embodiments, it will be evident that various modifications and changes may be made to the embodiments described above without departing from the scope of the invention as set forth in the claims below.

We claim:

1. A method of processing and interpreting seismic data, comprising:

identifying a plurality of extrema positions with sub-sample precision associated with said seismic data;

deriving coefficients that characterize the seismic data waveform, in the vicinity of said extrema positions wherein said derived coefficients are derived from a single extrema data point;

forming groups of said extrema positions using a Gaussian statistical model, wherein said coefficients that characterize the seismic data waveform are similar; storing said groups of extrema positions.

2. A method according to claim 1, wherein said coefficients are derivatives.

3. A method according to claim 2, wherein said derivatives are determined using orthogonal polynomials and said derivatives allow local reconstructions of seismic traces in the vicinity of said extrema positions to be obtained using Taylor series expansions.

4. A method according to claim 1, wherein said seismic data is subjected to orthogonal polynomial spectral decomposition and said extrema positions are identified based on said decomposed seismic data.

5. A method according to claim 4, wherein said orthogonal polynomial spectral decomposition comprises volume reflection spectral decomposition with Chebyshev polynomials used as the basis functions.

6. A method according to claim 1, wherein said process of forming groups of said extrema positions utilizing a statistical model further assumes that coefficient attribute vectors have a Gaussian distributions with separate parameters for each group.

7. A method according to claim 1, wherein said groups of extrema positions are further formed using supervised classification.

8. A method according to claim 7, wherein seed points for said supervised classification are picked by a user.

9. A method according to claim 1, wherein said groups of extrema positions are further formed using unsupervised classification.

10. A method according to claim 9, wherein a number of classes for said unsupervised classification is provided by a user.

11. A method according to claim 9, wherein seed points for said unsupervised classification are selected at random and small spatially contiguous horizon segments are extracted locally around said seed points.

12. A method according to claim 1, further including defining a volume of interest within said seismic data.

13. A method according to claim 12, wherein said volume of interest comprises a vertical window of constant thickness or a volume between two pre-interpreted seismic horizons.

14. A method according to claim 1, wherein horizon segments are extracted on opposite sides of input fault surfaces.

15. A method according to claim 14, wherein fault displacement estimates are determined using said extracted horizon estimates.

16. A method according to claim 15, wherein said fault displacement estimates are decomposed into vertical throw and horizontal heave components.

17. A method according to claim 1, wherein said groups of extrema positions are used to create a horizon interpretation.

18. A method according to claim 1, wherein said groups of extrema positions are used to extract a seismic volume containing multiple reflectors having similar seismic response.

19. A computer system for processing and interpreting seismic data, comprising:
  (a) means for identifying a plurality of extrema positions, with sub-sample precision, associated with said seismic data;
  (b) means for deriving coefficients that characterize the seismic data waveform in the vicinity of said extrema positions wherein said coefficients are derived from a single extrema data point; and
  (c) means for forming groups of said extrema positions using a Gaussian statistical model, wherein said coefficients that characterize the seismic data waveform are similar.

20. A computer program product for processing and interpreting seismic data, comprising:
  a computer useable medium having computer readable program code embodied in said medium for processing seismic data, said computer program product having:
  (a) computer readable program code means for identifying a plurality of extrema positions associated with said seismic data with sub-sample precision;
  (c) computer readable program code means for deriving coefficients from a single extrema data point that characterize the seismic data waveform in the vicinity of said extrema positions; and
  (c) computer readable program code means for forming groups of said extrema positions using a Gaussian statistical model, wherein said coefficients that characterize the seismic data are similar.

* * * * *